US011537699B2

United States Patent
Ballard et al.

(10) Patent No.: US 11,537,699 B2
(45) Date of Patent: *Dec. 27, 2022

(54) AUTHENTICATION TECHNIQUES IN RESPONSE TO ATTEMPTS TO ACCESS SENSITIVE INFORMATION

(71) Applicant: Apple Inc., Cupertino, CA (US)

(72) Inventors: Lucia E. Ballard, San Francisco, CA (US); Jerrold V. Hauck, Windermere, FL (US); Deepti S. Prakash, Sunnyvale, CA (US); Jan Cibulka, Prague (CZ); Ivan Krstic, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/084,172

(22) Filed: Oct. 29, 2020

(65) Prior Publication Data

US 2021/0049251 A1    Feb. 18, 2021

Related U.S. Application Data

(63) Continuation of application No. 16/371,860, filed on Apr. 1, 2019, now Pat. No. 10,839,058, which is a
(Continued)

(51) Int. Cl.
*H04M 1/66* (2006.01)
*G06F 21/32* (2013.01)
(Continued)

(52) U.S. Cl.
CPC .............. *G06F 21/32* (2013.01); *G06F 21/34* (2013.01); *G06F 21/6218* (2013.01);
(Continued)

(58) Field of Classification Search
CPC ...... G06F 21/32; G06F 21/34; G06F 21/6218; G06F 21/78; G06F 2221/2149;
(Continued)

(56) References Cited

U.S. PATENT DOCUMENTS 7,748,031 B2    6/2010  Gonzalez et al.
10,097,353 B1 *  10/2018  Carlson ................ H04L 67/306
(Continued)

FOREIGN PATENT DOCUMENTS

CN      101753301 A      6/2010
CN      102265255        11/2011
(Continued)

OTHER PUBLICATIONS

Office Action in Chinese Appl. No. 201810079544.X dated May 31, 2021, 9 pages.
(Continued)

*Primary Examiner* — Dai Phuong
(74) *Attorney, Agent, or Firm* — Kowert, Hood, Munyon, Rankin & Goetzel, P.C.; Michael B. Davis; Dean M. Munyon

(57) ABSTRACT

The present disclosure describes techniques for changing a required authentication type based on a request for a particular type of information. For example, consider a situation where a user has asked a virtual assistant "who owns this device?" By default, the device may allow biometric authentication to unlock. In response to identification of the owner by the virtual assistant, however, the device may require one or more other types of authentication (e.g., manual entry of a passcode) to unlock the device. In various embodiments, the disclosed techniques may increase the security of the device by making it more difficult for malicious entities to obtain the sensitive information or to access device functionality once the sensitive information has been disclosed.

(Continued)

In various embodiments, this may prevent or reduce unauthorized access to the device.

20 Claims, 9 Drawing Sheets

Related U.S. Application Data continuation of application No. 15/980,694, filed on May 15, 2018, now Pat. No. 10,824,705.

(60) Provisional application No. 62/514,906, filed on Jun. 4, 2017, provisional application No. 62/556,367, filed on Sep. 9, 2017.

(51) Int. Cl.
| | |
|---|---|
| G06F 21/78 | (2013.01) |
| G06F 21/62 | (2013.01) |
| H04L 9/32 | (2006.01) |
| H04L 9/40 | (2022.01) |
| H04M 1/72463 | (2021.01) |
| H04W 12/06 | (2021.01) |
| H04W 12/084 | (2021.01) |
| G06F 21/34 | (2013.01) |
| G06Q 20/32 | (2012.01) |

(52) U.S. Cl.
CPC ............ *G06F 21/78* (2013.01); *H04L 9/3226* (2013.01); *H04L 9/3231* (2013.01); *H04L 63/0861* (2013.01); *H04L 63/105* (2013.01); *H04M 1/72463* (2021.01); *H04W 12/068* (2021.01); *H04W 12/084* (2021.01); *G06F 2221/2149* (2013.01); *G06F 2221/2153* (2013.01); *G06Q 20/3227* (2013.01); *H04L 63/102* (2013.01); *H04L 2463/082* (2013.01)

(58) Field of Classification Search
CPC ........ G06F 2221/2153; H04W 12/068; H04W 12/084; H04M 1/72463; H04L 9/3226; H04L 9/3231; H04L 29/06809; H04L 63/0861; H04L 63/105; H04L 63/102; H04L 2463/082; G06Q 20/3227

See application file for complete search history.

(56) References Cited

U.S. PATENT DOCUMENTS

| | | | | |
|---|---|---|---|---|
| 10,440,007 | B1* | 10/2019 | Ramalingam | G06F 3/0484 |
| 10,609,021 | B2* | 3/2020 | Johansson | H04L 63/0853 |
| 11,010,763 | B1* | 5/2021 | Fillinger | G06V 40/70 |
| 2005/0165784 | A1* | 7/2005 | Gomez | G06F 16/951 |
| | | | | 707/999.009 |
| 2007/0005967 | A1 | 1/2007 | Mister et al. | |
| 2007/0015492 | A1 | 1/2007 | Bravo et al. | |
| 2009/0104888 | A1 | 4/2009 | Cox | |
| 2009/0210942 | A1 | 8/2009 | Abel | |
| 2012/0102565 | A1 | 4/2012 | Feraud | |
| 2014/0115696 | A1 | 4/2014 | Fadell et al. | |
| 2014/0123320 | A1 | 5/2014 | Isozaki et al. | |
| 2015/0074615 | A1 | 3/2015 | Han et al. | |
| 2017/0142589 | A1 | 5/2017 | Park et al. | |
| 2018/0013782 | A1 | 1/2018 | Choyi et al. | |
| 2018/0240541 | A1* | 8/2018 | Ervin | A61J 1/03 |
| 2018/0285881 | A1 | 10/2018 | Lee et al. | |
| 2019/0007203 | A1* | 1/2019 | Bolotin | G06F 21/602 |

FOREIGN PATENT DOCUMENTS

| | | |
|---|---|---|
| CN | 103051630 | 4/2013 |
| CN | 104022875 | 9/2014 |
| CN | 104345979 | 2/2015 |
| CN | 105279400 A | 1/2016 |
| CN | 205158495 U | 4/2016 |
| CN | 105659522 | 6/2016 |
| CN | 105760725 A | 7/2016 |
| CN | 105809005 A | 7/2016 |
| CN | 105933119 | 9/2016 |
| CN | 106095247 | 11/2016 |
| CN | 106228368 A | 12/2016 |
| CN | 106713278 A | 5/2017 |
| JP | 2011-512580 | 4/2011 |
| WO | 2016105553 | 6/2016 |
| WO | 2017055373 | 4/2017 |

OTHER PUBLICATIONS

Ram Garg, et al., Developing a Secured Biometric Payments Model Using Tokenization, Whitepaper, R Systems, 2015, 8 pages.
International Search Report and Written Opinion in PCT Application No. PCT/US2018/015503 dated Apr. 13, 2018, 11 pages.
Office Action in CN Appl. No. ZL201820136797.1 dated Feb. 22, 2019, 5 pages.
Written Opinion in Appl. No. PCT/US2018015503 dated Jun. 6, 2019, 6 pages.
Office Action in Chinese Appl. No. ZL2019200085760 dated Oct. 18, 2019, 5 pages.
Office Action in Chinese Appl. No. 201810079544.X dated Jan. 30, 2022, 8 pages.

* cited by examiner

You: who's phone is this?

Virtual Assistant: I believe this phone belongs to Jane Doe

Jane Doe
571-123-4567
Photo

AUTHENTICATION TECHNIQUES IN RESPONSE TO ATTEMPTS TO ACCESS SENSITIVE INFORMATION

CROSS-REFERENCE TO RELATED APPLICATIONS

The present application is a continuation of U.S. application Ser. No. 16/371,860, filed Apr. 1, 2019 (now U.S. Pat. No. 10,839,058), which is a continuation of U.S. application Ser. No. 15/980,694, filed May 15, 2018 (now U.S. Pat. No. 10,824,705), which claims the benefit of U.S. Provisional Appl. No. 62/514,906, filed Jun. 4, 2017 and U.S. Provisional Appl. No. 62/556,367, filed Sep. 9, 2017; the disclosures of each of the above-referenced applications are incorporated by reference herein in their entireties.

BACKGROUND

Technical Field

This disclosure relates generally to computer security, and, more specifically, to authentication techniques for computing devices that store sensitive user information.

Description of the Related Art

Traditional authentication measures typically rely on a user to provide one or more credentials attesting to the validity of the user. For example, a mobile device attempting to authenticate a user may ask the user to supply a password before allowing the user to access the device. In an effort to reduce the burden on a user, some devices may ask a user to supply a biometric credential. For example, a mobile device may include a fingerprint sensor configured to collect fingerprint biometric information, which may be compared with stored fingerprint information of a known user. As another example, a mobile device may use facial recognition to authenticate a known user. Biometric authentication may be advantageous as users may forget effective passwords and it also allows a user to authenticate more quickly than, for example, entering a password or some other credential.

Identification of a registered user or an owner of a device may be an authentication credential (e.g., a username in a username and password combination) or may be used to determine other credentials (e.g., if attempting to spoof a user's biometric credentials). Therefore, determining user identification may be a first step by malicious entities who want to gain unauthorized access to a user device. For example, if a malicious individual steals an unattended device and wants to unlock the device, it may be easier to determine other authentication factors if the user of the device is known.

SUMMARY

The present disclosure describes techniques for changing a type of authentication required based on detecting a request for a particular type of information. For example, consider a situation where a device discloses an identity of an owner of the device without being unlocked. In some embodiments, the device is configured to require manual entry of a passcode to unlock the device after the disclosure, rather than allowing biometric authentication. In various embodiments, the disclosed techniques may prevent or reduce unauthorized access to the device.

BRIEF DESCRIPTION OF THE DRAWINGS

FIGS. 4A-4E are diagrams illustrating exemplary user interfaces, according to some embodiments.

Figure 1:
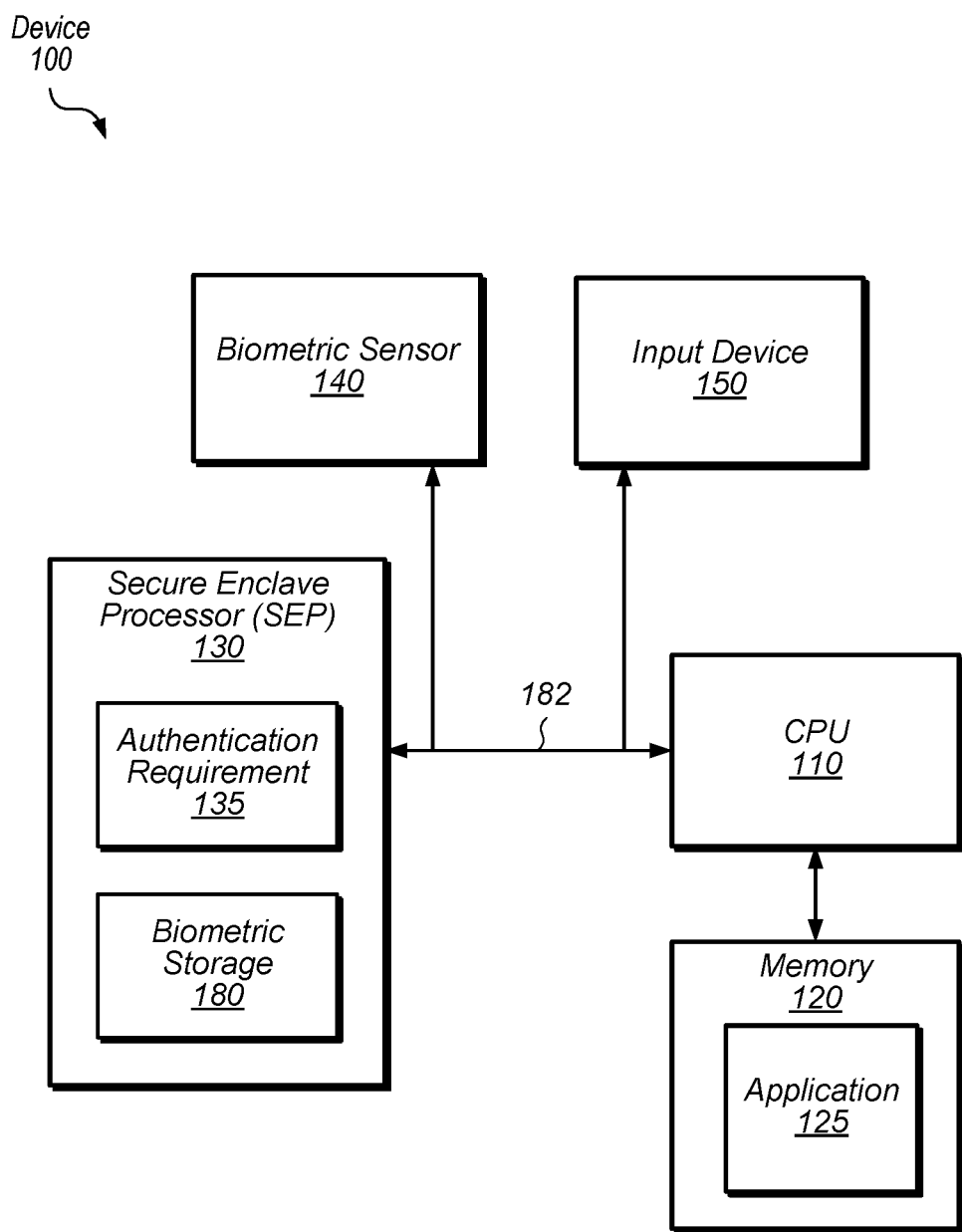
FIG. 1 is a block diagram illustrating an example of a computing device that authenticates a user based on biometric data, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform an authentication" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

OVERVIEW OF EXEMPLARY EMBODIMENTS

The present disclosure is generally directed to authentication techniques in the context of particular user actions that could be associated with unauthorized users. Examples of such actions include requests for particular types of information (e.g., information that identifies a user), use of a device to perform certain actions such as an emergency call from a lock screen, display of contact information by a device, etc. Individuals attempting to steal a device (or access information on the device without authorization) typically need an identification of the device owner to break into a locked device. The device itself may store this information in various forms, and may also store information identifying multiple users or owners. For example, the device may be configured to store medical information, the name of the individual, the user's contact information (which may be explicitly associated with the owner by a virtual assistant application), the phone number associated with the device, etc. Unfortunately, if a user leaves their device unattended, then a malicious person may access the identity information.

By way of example, certain information may be accessible without authentication, e.g., via a lock screen of the device. For example, a virtual assistant application may be configured to answer questions without requiring unlocking of the device. Further, the device may issue biometric tokens to one or more elements to allow performance of certain activities without additional authentication for a particular time interval (e.g., a secure element may be issued a token to enable mobile payments without additional authentication). As another example, if the device is left unattended after a device owner already having performed authentication, various information may be readily available via the device.

Therefore, in disclosed embodiments, a computing device is configured to require a non-default form of authentication in response to a user attempt to access certain types of information. For example, instead of allowing biometric authentication, the device may require manual entry of an authentication credential in order to unlock the device, access the requested information, access other device functionality, etc.

FIG. 1 is a block diagram illustrating an exemplary device 100, according to some embodiments. Device 100 may be a mobile device such as a cellular phone or a laptop, for example. In other embodiments, device 100 may be stationary, such as a desktop computer. In some embodiments, device 100 is a wearable device. The disclosed examples of device 100 are included for purposes of explanation but are not intended to limit the scope of the present disclosure. Various elements of device 100 (e.g., SEP 130 and CPU 110) may be included in the same system-on-a-chip (SOC).

In the illustrated embodiment, device 100 includes central processing unit (CPU) 110, memory 120, secure enclave processor 130, biometric sensor 140, and input device 150. In the illustrated embodiment, elements 110, 130, 140, and 150 are configured to communicate via interconnect 182.

In the illustrated embodiment, in response to a request for sensitive information, CPU 110 is configured to forward the request to SEP 130. In some embodiments, the sensitive information is stored in or controlled by the SEP 130 and is not accessible to CPU 110 other than via SEP 130. In other embodiments, the information may be available to CPU 110 (e.g., stored in memory 120. In the illustrated embodiment, in response to the request, SEP 130 is configured to adjust authentication requirements, e.g., by changing a value of authentication requirement 135 and/or revoking tokens issued to other elements of device 100 (not explicitly shown). CPU 110 may include one or more processor cores. Generally, a processor core may include circuitry configured to execute instructions defined in an instruction set architecture implemented by the processor. Processors may be implemented on an integrated circuit with other components as a system on a chip (SOC) or other levels of integration. Processors may further include discrete microprocessors, processor cores and/or microprocessors integrated into multichip module implementations, processors implemented as multiple integrated circuits, etc.

Application 125, in some embodiments, is an application executable by CPU 110 to facilitate performance of a user authentication. Execution of application 125 may cause CPU 110 to communicate with biometric sensor 140 to perform biometric authentication. In some embodiments, SEP 130 is involved in the biometric authentication process, in place of or in addition to CPU 110. Memory 120, in the illustrated embodiment, is configured to store program instructions of application 125. Memory 120 may generally include circuitry for storing data. For example, memory 120 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Device 100 may include a memory controller (not shown) that may include queues for memory operations, for ordering (and potentially reordering) the operations and presenting the operations to the memory 120. The memory controller may further include data buffers to store write data awaiting write to memory and read data awaiting return to the source of the memory operation. In some embodiments, the memory controller may include a memory cache to store recently accessed memory data. In some embodiments memory 120 may include program instructions, such as instructions of application 125 that are executable by one or more processors to cause device 100 to perform various functionality described herein.

In some embodiments, application 125 is executable to facilitate interfacing between SEP 130, and a user of device 100 when authentication is performed. Accordingly, application 125 may provide various prompts to the user instructing the user to perform various actions during these processes. Application 125 may also activate biometric sensor 140 and/or SEP 130 when appropriate during these processes.

Biometric sensor 140, in some embodiments, is configured to generate data based on biometric features such as fingerprints, eye features (e.g., iris characteristics), facial features, etc. Although a single biometric sensor is discussed herein, multiple biometric sensors may be used to improve security of a biometric authentication procedure. Alternatively, multiple biometric authentication procedures using different sensors for different levels of authentication may be implemented.

SEP 130, in the illustrated embodiment, is configured to maintain authentication requirement information 135 and biometric storage 180. In other embodiments, authentication requirement information 135 may be stored in another storage element or processing element. In some embodiments, SEP 130 is a secure circuit configured to authenticate an active user (i.e., the user that is currently using device 100). As used herein, the term "secure circuit" refers to a circuit that protects an isolated, internal resource from being directly accessed by an external circuit. This internal resource may be memory that stores sensitive data such as personal information (e.g., biometric information, credit card information, etc.), encryptions keys, random number generator seeds, etc. This internal resource may also be circuitry that performs services/operations associated with sensitive data. In various embodiments, SEP 130 is configured to authenticate a user based on additional authentication credentials, e.g., manually entered by a user via input device 150. In some embodiments, SEP 130 is configured to compare biometric information from sensor 140 with template biometric data for a user in biometric storage 180. Functionality described herein as being performed by SEP 130 may be implemented using dedicated circuitry, by executing program instructions stored in a non-transitory computer-readable medium (not explicitly shown), or by a combination of the two, in some embodiments.

Input device 150, in the illustrated embodiment, is configured to receive user input and send user input data to CPU 110. Input device 150 may be a touchpad, button, or touchscreen, for example.

In some embodiments, SEP 130 is also configured to store one or more sensitive types of information. One such type of information is information that identifies a user or owner of device 100. Sensitive information may be used to at least partially authenticate a user, for example. In other embodiments, SEP 130 is configured to encrypt these types of information and store them outside of SEP 130, e.g., in memory 120. In these embodiments, SEP 130 still maintains control over this type of information, especially in embodiments where the encryption key used to encrypt the sensitive information is internal to SEP 130.

Authentication requirement 135, in some embodiments, indicates one or more types of information required to perform one or more actions. Non-limiting examples of actions include unlocking device 100, using sensors of device 100, opening specific applications, accessing certain data, etc. In some embodiments, a default authentication requirement may allow multiple types of authentication (e.g., either biometric or manual) to perform various actions. In some embodiments, a heightened authentication requirement may allow only a subset of the available types of authentication (e.g., manual only). In some embodiments, a heightened authentication requirement may require multiple types of authentication (e.g., both manual and biometric). In some embodiments, in response to a request to access certain types of information, SEP 130 is configured to change authentication requirement 135 from a first state to a second state.

In some embodiments, SEP 130 is configured to maintain information indicating, for each of multiple authentication types, whether that type of authentication is currently valid (e.g., has been performed within a particular recent time interval). In some embodiments, SEP 130 is configured to authorize various functionality based on logical combinations of whether certain types of authentication are currently valid.

In some embodiments, authentication requirement 135 indicates, for specific actions or types of actions, the type of authentication currently required to perform those actions (which may vary in different operations modes of device 100). In some embodiments, in response to user activity that could result in disclosure of information identifying a user of device 100, SEP 130 is configured to alter authentication requirement 135 to require additional authentication (e.g., more types of authentication than required in a normal operating mode) in order to perform certain actions or types of actions. For example, if a user accesses a medical ID via a lock screen, SEP 130 may alter authentication requirement 135 for an operation to unlock the device such that, in addition manual entry of an authentication credential is required. As another example, SEP 130 may require multiple types of biometric authentication instead of a single type of biometric authentication, in this scenario. Any of various second factors may also be required as a different type of authentication, in addition to and/or in place of first factors discussed herein. For example, SEP 130 may cause information to be sent to another trusted device (e.g., an additional password or other information may be sent to a personal computer owned by the same user) and require that the information be entered into device 100. Still another example of second factor authentication involves the user being required to be in a particular location or within a particular proximity to another device (e.g., to a wireless access point or to another device of the user, which may be verified by network connectivity, near-field communications, satellite navigation data, cellular triangulation, etc.). In some embodiments, device 100 may be configured to communicate with one or more servers to initiate and/or facilitate second factor authentication.

In some embodiments, SEP 130 is configured to issue a token to one or more other processing elements in response to user authentication. For example, SEP 130 may issue a token to a payment processing element to be used for payment transactions. The token may be a signed response to challenge information sent from the other processing elements, e.g., SEP 130 may receive challenge information and sign the challenge information based on a stored private encryption key. The payment processing element (e.g., a secure element (SE)) may be configured to confirm presence of a valid token from SEP 130 before sending payment credentials, for example. In some embodiments, in response to a request for a particular type of information, SEP 130 is also configured to invalidate a token sent to another processing element, such that another token must be negotiated before performing the activity authorized by the token. SEP 130 may invalidate the token by sending information to the other processing element indicating that the token has been revoked, for example. Speaking generally, SEP 130 may alter authentication requirements maintained by SEP 130 (e.g., information 135) and/or authentication state maintained by other processing elements, in response to a request for a particular type of information.

Although FIG. 1 depicts components within a device 100 for purposes of illustration, the particular configuration of FIG. 1 is not intended to limit the scope of the present disclosure. As one example, any of various interconnect implementations may be used in other embodiments to connect the elements of FIG. 1. As another example, at least a portion functionality described as being performed by one element of FIG. 1 may be performed by other elements of FIG. 1 or other elements not described, in other embodiments.

Note that various actions described herein as being performed by SEP 130 may be performed by CPU 110 and/or facilitated by CPU 110. For example, CPU 110 may execute an authentication layer or other code that enforces a profile which uses API calls to SEP 130 to facilitate various functionality disclosed herein. In various embodiments, using SEP 130 for both biometric authentication and to facilitate disclosed techniques relating to adjusting authentication requirement 135 may improve security of device 100, relative to an untrusted processor performing the disclosed techniques.

Figure 2A:
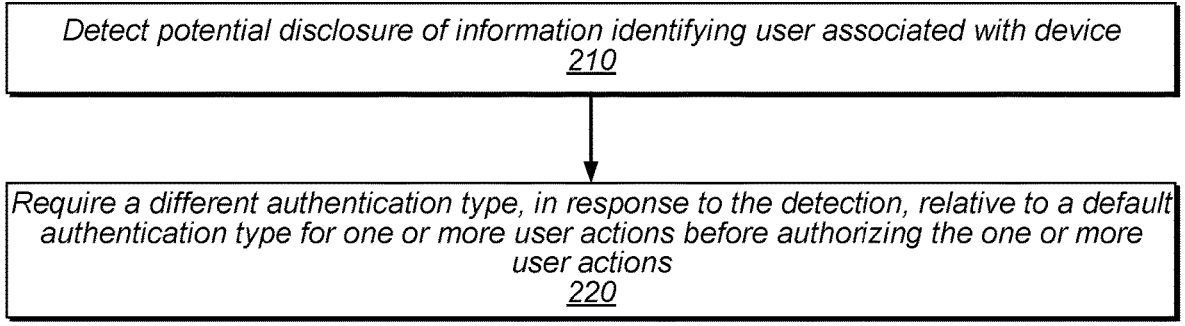
FIG. 2A is a flow diagram illustrating an exemplary method for requiring a different authentication type for an action in response to a request for particular information, according to some embodiments.

FIG. 2A is a block diagram illustrating an exemplary method for requiring a different type of authentication in response to detecting potential disclosure of information identifying a user associated with a device, according to some embodiments. The method shown in FIG. 2A may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 210, in the illustrated embodiment, device 100 detects potential disclosure of information identifying a user associated with the device. This may include, for example: determining that user information was displayed on a screen of the device (e.g., of a name, phone number, medical ID, username, etc.), detecting user input requesting particular types of information, detecting removal of a SIM card, detecting transmission (e.g., wireless) of user information to a nearby device, detecting auditory output of information by a virtual assistant, etc. In some embodiments, other suspicious user actions such as making an emergency call from a lock screen may replace method element 210, even if user-identifying information is not disclosed. Note that various ones of these potential disclosures of information may occur without prior user authentication.

At 220, in the illustrated embodiment, device 100 requires a different authentication type in response to the detection of element 210, relative to a default authentication type for one or more user actions, before authorizing the one or more user actions. For example, rather than allowing either biometric authentication or manual entry of a PIN to unlock a lock screen of device 100 based on default user preferences, device 100 (e.g., via SEP 130) may require manual entry of a PIN only (or may require both manual and biometric authentication). Referring to a different authentication "type" may refer to different combinations of authentication types as well as independent types. Examples of types of authentication types that may be required include, without limitation: manual input of a password or PIN, voice authentication, facial recognition, fingerprint recognition, eye recognition, gesture recognition, etc.

In some embodiments, element 220 may be described as entering a second mode of operation relative to a first (e.g., default) mode of operation. The change in mode may be specified by authentication requirement 135, for example.

Device 100 may enter the second mode of operation in response to method element 210.

Figure 2B:
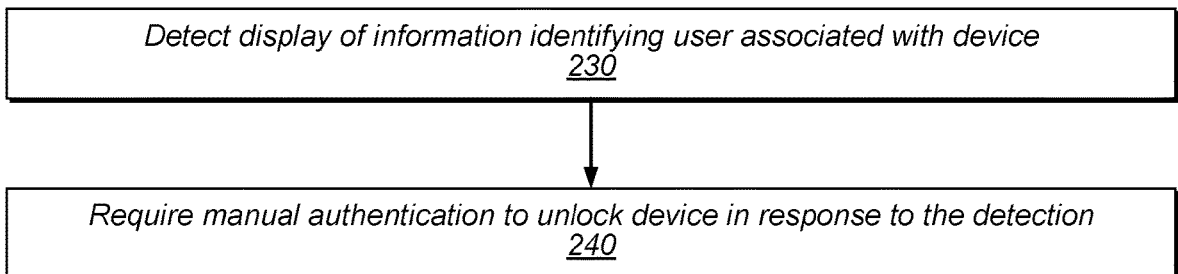
FIG. 2B is a flow diagram illustrating an exemplary method for requiring manual authentication in response to detecting disclosure of information indicating a user associated with a device, according to some embodiments.

FIG. 2B is a flow diagram illustrating method for requiring manual entry of an authentication credential after display of information, according to some embodiments. The method shown in FIG. 2B may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired. Note that FIG. 2B is a specific example of the method of FIG. 2A. Exemplary interfaces that may correspond to the methods of FIGS. 2A and 2B are discussed below with reference to FIGS. 4A-4C.

At 230, in the illustrated embodiment, device 100 detects display of information identifying a user associated with the device.

At 240, in the illustrated embodiment, device 100 requires manual authentication to unlock the device in response to the detection, where manual authentication was not required prior to detection of the display of information. In some embodiment, device 100 is also configured to require authentication before displaying the requested information.

In some embodiments, SEP 130 is also configured to revoke or invalidate one or more tokens that were issued to other processing elements based on the detection of method element 210. This may require a user to re-authenticate to generate another token before performing an action facilitated by the other processing elements, such as a payment transaction, network connection, device mode of operation, etc.

Although requesting to access a particular type of stored information is discussed in FIG. 2A, other examples of activities that may cause device 100 to require one or more different authentication types than a default authentication type may include: making an emergency call from a lock screen, removing a SIM card (which may then be accessed to determine a phone number associated with the device, for example), display of another particular type of information by the device (which may occur even without an explicit user request for the information, as a pop-up notification, for example), etc.

In some embodiments, the particular type of information includes information identifying a registered user of device 100, e.g., a user who has created one or more accounts on device 100. Note that there may be multiple registered users of a given device 100. In some embodiments, one or more registered users are enrolled users who have created template data for biometric authentication. In some embodiments, the particular type of information includes information identifying an owner of device 100. Examples of such information may include the name of the individual, their contact information, their medical information, etc. Although various information related to the identity of a user of device 100 are discussed herein, these examples are not intended to limit the scope of the present disclosure. In other embodiments, similar techniques may be implemented in response to attempts to access any of various types of information. In some embodiments, device 100 may classify different types of information based on their sensitivity and require a greater or smaller number of authentication credentials at element 220 depending on determined classification of the requested type of information.

Exemplary Lockout Triggers

In various embodiments, device 100 is configured to impose a lockout in response to various event triggers. A lockout may prevent all access to a device for a predetermined time interval (or indefinitely) or may require additional authentication to bypass the lockout (e.g., using a password or PIN in addition to or in place of biometric authentication, or using a secret key known only to a manufacturer). For example, a "bio-lockout" may require one or more non-biometric authentication types before allowing access to device 100. In various embodiments, bio-lockout may increase the difficulty of biometric spoofing and/or replay attacks, for example. In various embodiments, multiple different types of lockout may be implemented in a given device, with different intervals, unlock conditions, etc. The following discussion provides non-limiting examples of events that cause device 100 to enter a lockout state, in some embodiments.

In some embodiments, reboot of device 100 or a remote indication from a user may cause lockout. In some embodiments, a determination that a time interval has occurred since a last successful authentication of a user may cause a lockout. For example, if a user has not authenticated for multiple days, entry of a PIN or password may be required in addition to or in place of biometric authentication. In some embodiments, dismissing an emergency screen in one or more ways may cause a lockout. In some embodiments, circumventing lockout may require permission from another trusted device or the user may be required to call a service to gain access.

Lockout triggers relating to biometric authentication may include: a particular number of unsuccessful match biometric attempts (attempts may only be counted if a face or fingerprint is detected, but does not match a known user, for example), receipt of biometric data after expiration of a session key, receipt of biometric data with a missing or incorrect signature, receipt of biometric data previously-received data, etc.

Note that, in some embodiments, multiple ones of these events may be counted together. Further, different triggers may cause different lockout intervals, and additional triggers may increase a current lockout interval.

In some embodiments, before allowing biometric authentication, device 100 is configured to require a user to set up device 100 with a passcode for unlocking the device. Biometric authentication (e.g., facial recognition) may then be used to unlock device 100 without using the passcode. This may allow device 100 to require a longer and/or more complex passcode than traditional passcodes, e.g., because the user may use the passcode less frequently. A stronger passcode may increase the overall security of device 100. In some embodiments, device 100 will always accept a passcode for a known user instead of facial recognition. In some embodiments, the passcode is required in the following exemplary situations: the device has just been turned on or restarted, the device has not been unlocked within a threshold time interval, the passcode has not been used to unlock the device within a threshold time interval, the device has received a remote lock command, facial recognition has been unsuccessful more than a threshold number of attempts, power off or emergency mode has been initiated and then canceled, or information identifying the user of the device has been provided.

In some embodiments, when biometric authentication is disabled, keys for highly protected data (e.g., data controlled by SEP 130) are discarded. Examples of such data may include keychain information such as form-filling information based on past activity of one or more authorized users on websites. In these embodiments, protected data is then inaccessible until device 100 is unlocked using the passcode.

In some embodiments, when biometric authentication is enabled, such keys are not discarded when the device locks, but are wrapped with a key provided by SEP 130. If a facial recognition session is successful, SEP 130 may provide the key for unwrapping the data protection keys and unlock device 100. This cooperation between data protection and biometric authentication systems may increase security. In various embodiments, one or more keys relating to facial recognition are discarded when passcode entry is required.

The biometric comparison discussed herein may be a fingerprint comparison, facial comparison, eye comparison, etc. Device 100 may include any of various appropriate biometric equipment (e.g., scanners, cameras, projectors, etc.) in order to measure biometric information.

Figure 2C:
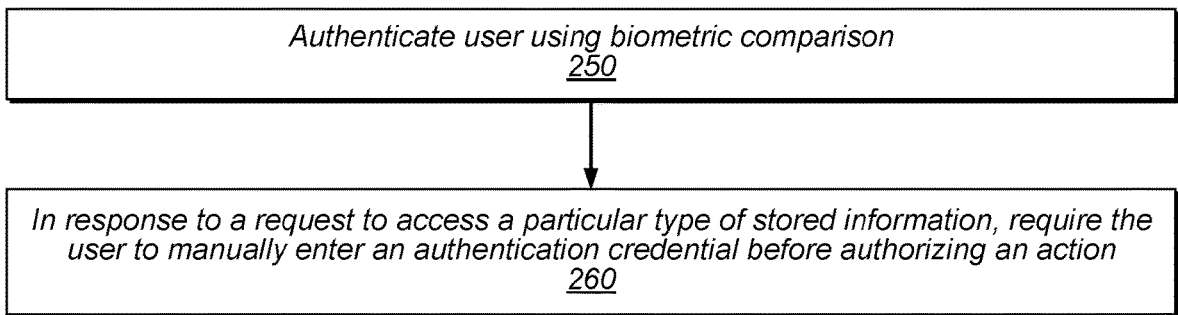
FIG. 2C is a flow diagram illustrating an exemplary method for requiring manual entry of an authentication credential after biometric authentication has already been performed, according to some embodiments.

FIG. 2C is a flow diagram illustrating method for requiring authentication or re-authentication in response to a request for sensitive information, according to some embodiments. The method shown in FIG. 2C may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 250, device 100 authenticates a user via biometric authentication. SEP 130 may perform the authentication by comparing data from biometric sensor 140 with template data in biometric storage 180. SEP 130 may issue one or more tokens to other processing elements based on the authentication. In other embodiments, other types of authentication (e.g., non-biometric) may be implemented for method element 250.

At 260, in response to a request to access a particular type of stored information, SEP 130 requires the user to manually enter an authentication credential before authorizing an action. The action may be providing the particular type of information or unlocking the device, for example. In some embodiments, SEP 130 is also configured to require re-authentication using biometric techniques in addition to manual entry of the authentication credential before providing the particular type of information. In these embodiments, SEP 130 is configured to verify both the biometric sample and the manual credential. The request may be input to the device using a touchscreen or microphone, for example, via a user interface and/or a virtual assistant (e.g., which may implement artificial intelligence to answer user queries). In some embodiments, device 100 may enter a locked state in response to disclosure of information and issue a heightened authentication requirement for unlocking the device.

Consider, for example, a situation where a user leaves their mobile device sitting on a table with the screen unlocked (e.g., the user may have already unlocked the screen using biometric authentication). A malicious individual may pick up the mobile device and try to access information that identifies an owner of the device. In response to the attempt, the mobile device (e.g., device 100) may enter a locked mode and display a lock screen. The device may require both a manual authentication credential such as a PIN and biometric authentication before unlocking and/or before allowing access to the requested information.

In some embodiments, device 100 is also configured to delete the requested information, e.g., after a certain number of failed authentication attempts subsequent to the attempt to access the information. As discussed above, SEP 130 may also revoke one or more tokens, which may prevent the user from performing other device functionality until re-authenticating.

In some embodiments, device 100 is configured to require manual entry of a passcode in order to alter authentication settings (e.g., facial recognition settings) even if the user has already been authenticated biometrically.

Figure 3:
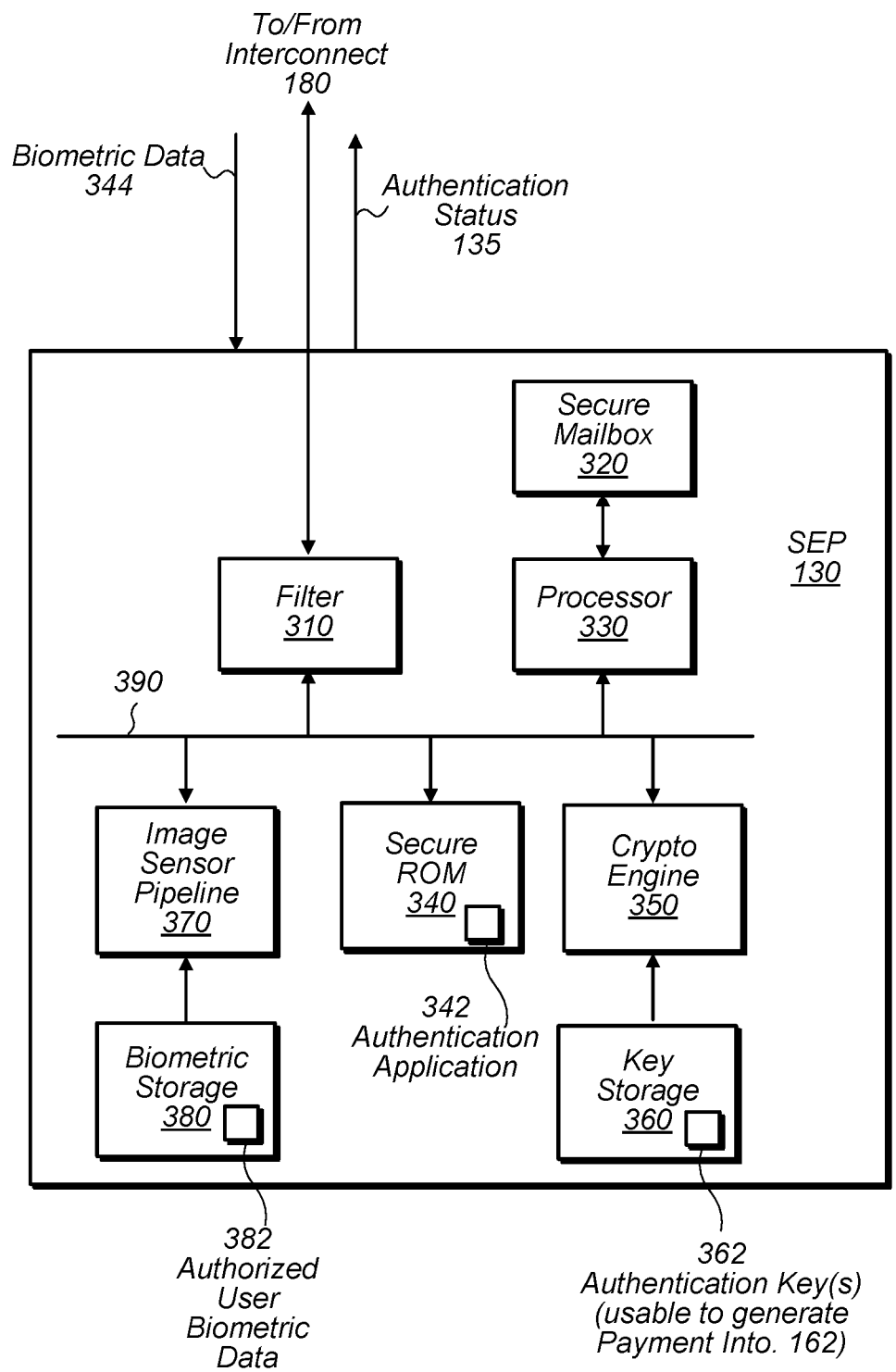
FIG. 3 is a block diagram illustrating an exemplary secure circuit, according to some embodiments.

FIG. 3 is a block diagram illustrating an exemplary SEP 130, according to some embodiments. In the illustrated embodiment, SEP 130 includes a filter 310, secure mailbox 320, processor 330, secure ROM 340, cryptographic engine 350, a key storage 560, and an image sensor pipeline 370 coupled together via an interconnect 390. In some embodiments, SEP 130 may include more (or less) components than shown in FIG. 3. As noted above, SEP 130 is a secure circuit that protects an internal resource such as components user authentication keys 362 and/or image sensor pipeline 370. As discussed below, SEP 130 implements a secure circuit through the use of filter 310 and secure mailbox 320.

Filter 310, in the illustrated embodiment, is circuitry configured to tightly control access to SEP 130 to increase the isolation of the SEP 130 from the rest of the computing device 100, and thus the overall security of the device 100. More particularly, in some embodiments, filter 310 is configured to permit read/write operations from a CPU 110 (or other peripherals on a fabric coupling CPU 110 and SEP 130) to enter SEP 130 only if the operations address the secure mailbox 320. Therefore, other operations may not progress from the interconnect 182 into SEP 130, in these embodiments. Even more particularly, filter 310 may permit write operations to the address assigned to the inbox portion of secure mailbox 320, and read operations to the address assigned to the outbox portion of the secure mailbox 320. All other read/write operations may be prevented/filtered by the filter 310. Therefore, secure mailbox 320 includes predetermined memory locations that are accessible to other elements in device 100 and the remainder of the circuitry in SEP 130 is not accessible to other elements of device 100. In some embodiments, filter 310 may respond to other read/write operations with an error. In one embodiment, filter 310 may sink write data associated with a filtered write operation without passing the write data on to local interconnect 390. In one embodiment, filter 310 may supply non-secure data as read data for a filtered read operation. This data (e.g., "garbage data") may generally be data that is not associated with the addressed resource within the SEP 130. Filter 310 may supply any data as garbage data (e.g. all zeros, all ones, random data from a random number generator, data programmed into filter 310 to respond as read data, the address of the read transaction, etc.).

In various embodiments, filter 310 may only filter external read/write operations. Thus, the components of the SEP 130 may have full access to the other components of computing device 100 including CPU 110, memory 120, and/or sensor 140. Accordingly, filter 310 may not filter responses from interconnect 182 that are provided in response to read/write operations issued by SEP 130.

Secure mailbox 320 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from CPU 110. The outbox may store write data from write operations sourced by processor 330. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 110 (e.g., application 125) may request services of SEP 130 via an application programming interface (API) supported by an operating system of computing device 100—i.e., a requester may make API calls that request services of SEP 130. These calls may cause corresponding requests to be written to mailbox mechanism 320, which are then retrieved from mailbox 320 and analyzed by processor 330 to determine whether it should service the requests. Accordingly, this API may be used to deliver biometric data 142 and authorization indication 152 to mailbox 320, request authentication of a user by verifying this information, and delivering an authentication result 302 via mailbox. By isolating SEP 130 in this manner, integrity of image sensor pipeline 370 may be enhanced.

SEP processor 330 is configured to process commands received from various sources in computing device 100 (e.g. from CPU 110) and may use various secure peripherals to accomplish the commands. Processor 330 may then execute instructions stored in secure ROM 340 such as authentication application 342 to perform an authentication of a user. For example, SEP processor 330 may execute application 342 to provide appropriate commands to image sensor pipeline 370 in order to verify biometric data 142 and/or indication 152. In some embodiments, application 342 may include encrypted program instructions loaded from a trusted zone in memory 120.

Secure ROM 340 is a memory configured to store program instruction for booting SEP 130. In some embodiments, ROM 340 may respond to only a specific address range assigned to secure ROM 340 on local interconnect 390. The address range may be hardwired, and processor 330 may be hardwired to fetch from the address range at boot in order to boot from secure ROM 340. Filter 310 may filter addresses within the address range assigned to secure ROM 340 (as mentioned above), preventing access to secure ROM 340 from components external to the SEP 130. In some embodiments, secure ROM 340 may include other software executed by SEP processor 330 during use. This software may include the program instructions to process inbox messages and generate outbox messages, code to interface with other processing elements, etc.

Cryptographic engine 350 is circuitry configured to perform cryptographic operations for SEP 130, including key generation as well as encryption and decryption using keys in key storage 360. Cryptographic engine 350 may implement any suitable encryption algorithm such as DES, AES, RSA, etc. In some embodiments, engine 350 may further implement elliptic curve cryptography (ECC). In various embodiments, engine 350 is responsible for decrypting traffic received from other processing elements and encrypting traffic sent to other processing elements.

Key storage 360 is a local memory (i.e., internal memory) configured to store cryptograph keys. In some embodiments, these keys may include keys used to establish the secure channels between SEP 130 and other processing elements. As shown, in some embodiments, these keys include authentication keys 362. These keys may also be used to verify the identity of SEP 130, e.g., by signing challenge data from other processing elements.

Image sensor pipeline 370, in one embodiment, is circuitry configured to compare biometric data 142 captured from a user being authenticated with biometric data 372 of an authorized user. In some embodiments, pipeline 370 may perform the comparison using a collection of neural networks included in pipeline 370, each network being configured to compare biometric data 142 captured in a single frame with biometric data 372 captured in multiple frames for an authorized user. As shown, pipeline 370 may be configured to read, from memory 120, biometric data 372, which may be protected by encryption in some embodiments or being stored in an associated part of memory 120 that is only accessible to SEP 130. (In another embodiment, SEP 130 may store data 372 internally.)

Note that although biometric storage 380 is included in SEP 130 in the illustrated embodiment, in other embodiments SEP 130 is configured to encrypt data 382 (e.g., using an encryption key in key storage 260) and store the encrypted data outside of SEP 130. In some embodiments, the encryption key used for such encryption never leaves SEP 130 and is unique to device 100, which may improve security of such encrypted data when stored outside of SEP 130.

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Exemplary Interfaces

Figure 4A:
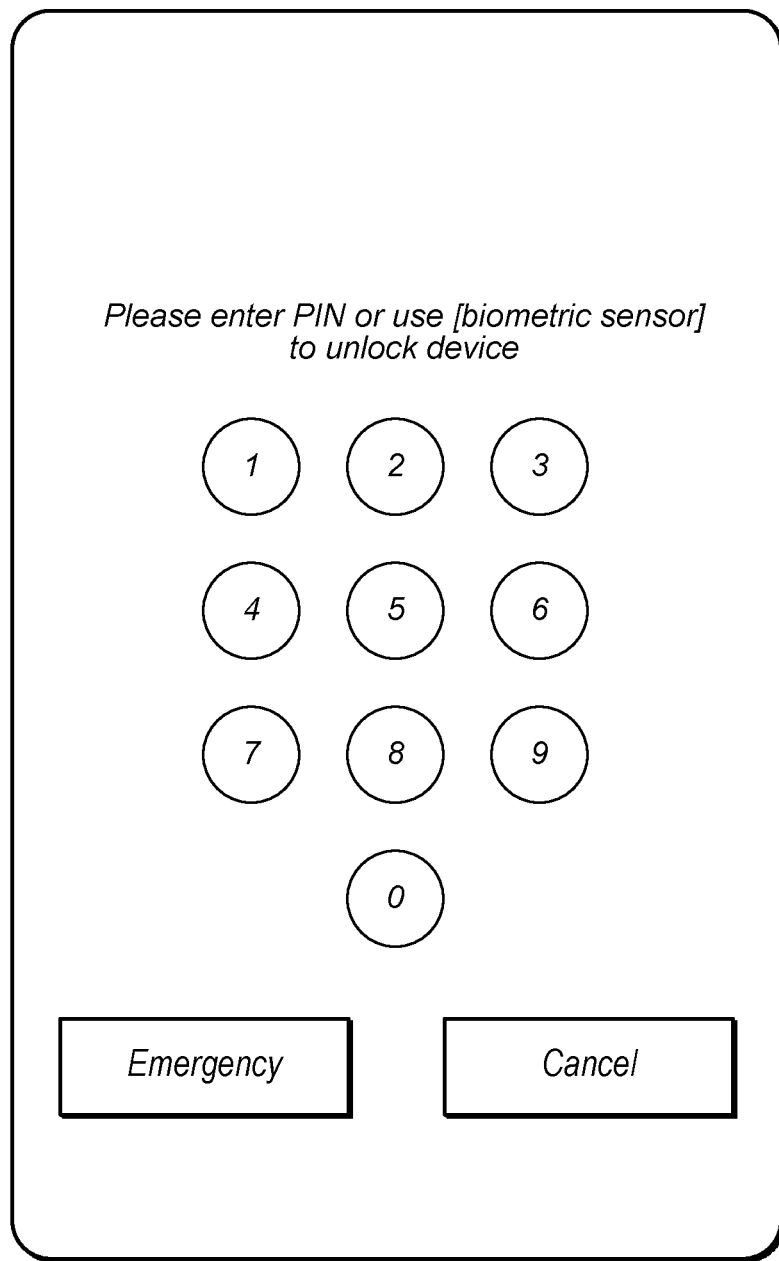

FIG. 4A illustrates an exemplary lock screen user interface, according to some embodiments. In the illustrated embodiment, the lock screen include a displayed keypad and indicates that the user can either enter a PIN or use a biometric sensor to authenticate and unlock the device. Note that the user interface may explicitly specify one or more particular sensors or types of biometric authentication that are valid for unlocking the lock screen. In other embodiments, the lock screen may not specify what authentication types are valid, but device 100 may be configured to allow either biometric or manual authentication in a default configuration. In other embodiments or user configurations of settings, any of various authentication types or combinations of authentication types may be implemented as a default requirement and/or as a heightened authentication requirement.

Illustrated examples of actions that may trigger a change in authentication type required for one or more actions include entering an emergency menu and making an emergency call via the lower left element of the user interface (FIG. 4E, discussed below, illustrates an exemplary emergency menu screen). These functions may be important to allow other users to access device functionality or medical information in certain situations, but may also be clues that an unauthorized individual is using device 100, such that increased authentication requirements for other actions may be desirable. In some embodiments, there may be a timeout interval following a suspicious action, after which device 100 may revert to a default authentication type for one or more actions. In some embodiments, device 100 may revert to default authentication procedure for one or more actions after a user has successfully authenticated using the different authentication type required in response to suspicious activity.

Another example of information disclosure via the lock screen is a pop-up notification, e.g., a notification that an account abc@email.com has received a message from another user xyz. This is another example of information potentially identifying a user of device 100, by identifying an email account registered with device 100.

FIG. 4B illustrates another exemplary disclosure of information identifying a user of device 100 via a virtual assistant. In the illustrated embodiment, a user has asked "who's phone is this" and the virtual assistant has replied "I believe this phone belongs to Jane Doe" and has displayed Jane's phone number and photograph. In some embodiment, the virtual assistant may be configured to perform this functionality without prior authentication (e.g., while the device is still locked). Note that the virtual assistant may be a program executed by device 100 and/or one or more other devices (e.g., using paired devices or cloud computing).

In embodiments in which device 100 is in communication with another device, device 100 may indicate to the other device that the other device should also require a different type of authentication. For example, if device 100 is a mobile device that is paired with a smartwatch and device 100 detects disclosure of certain types of information, it may indicate to the smartwatch to require a different authentication type than a default type (or vice versa). Thus, speaking generally, a lockout procedure on one device may also trigger lockout on one or more other devices.

Figure 4C:
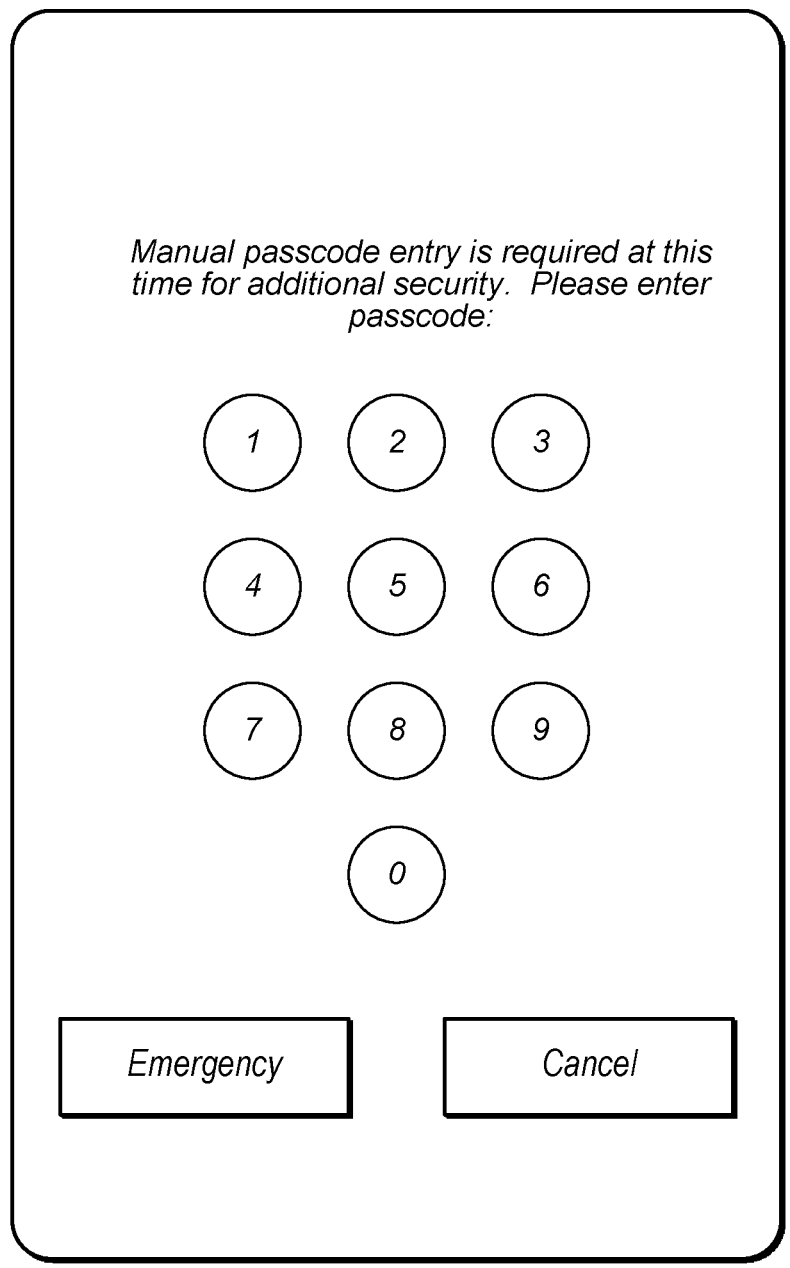

In some embodiments, the device may require manual entry to unlock the lock screen. For example, FIG. 4C shows an exemplary lock screen that indicates that manual passcode entry is required. This may be displayed in response to the user attempting to biometrically authenticate, e.g., by placing their finger on a fingerprint sensor or attempting to trigger facial recognition authentication.

Figure 4D:
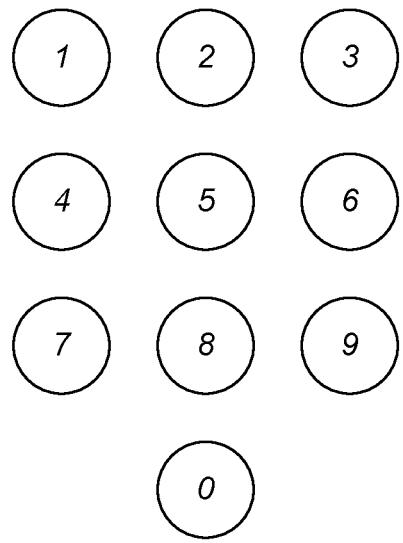

FIG. 4D illustrates an exemplary user interface requiring re-authentication in response to expiration of a token for a particular activity. Although the interface states that a token has "expired," in some embodiments the token is revoked by SEP 130, e.g., in response to method element 150 of FIG. 2B. Any of various authentication types may be required to re-generate a token for the desired action. For example, a secure element for payment transactions may have previously obtained a biometric token for use in payment transactions, which SEP 130 may have invalidated in response to potential disclosure of user information. At this point, device 100 may display the user interface of FIG. 4D to require re-authentication (note that re-authentication also may be required even in embodiments where tokens are not used). Re-authentication may or may not be of a default type.

Figure 4E:
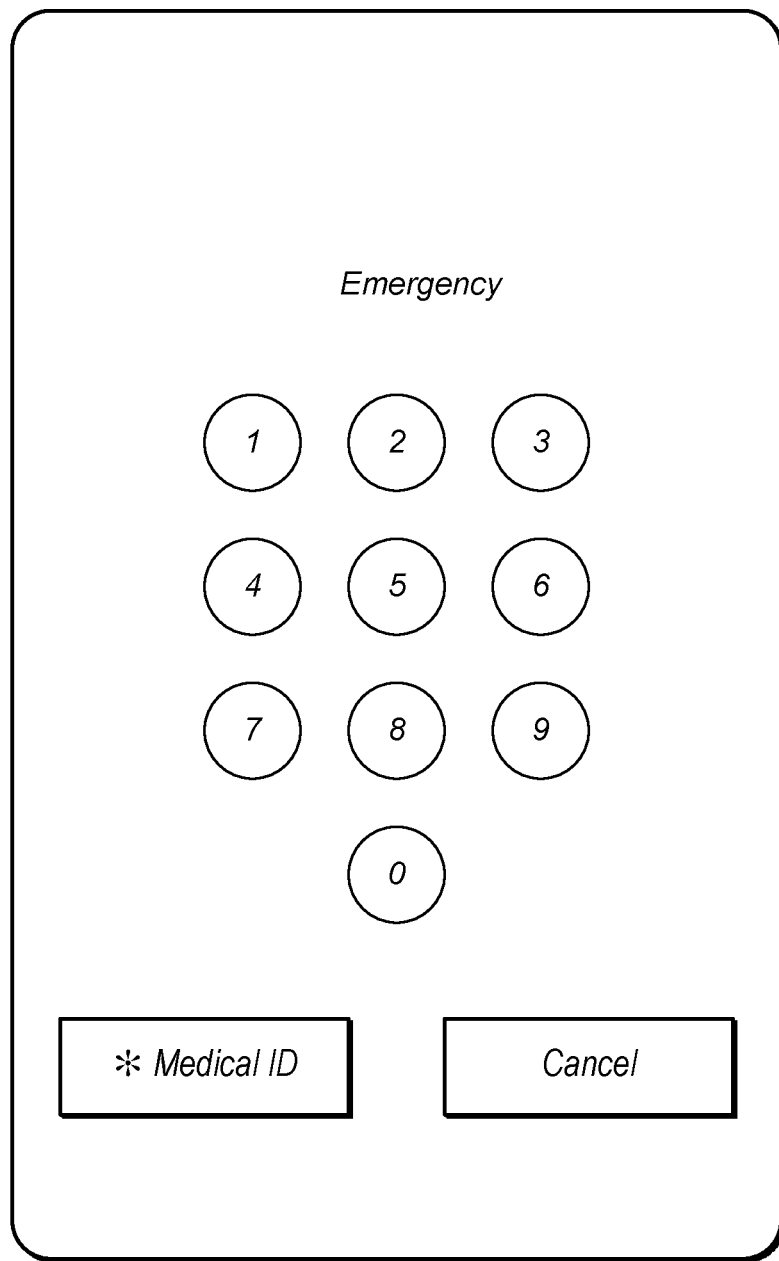

FIG. 4E illustrates an exemplary emergency menu interface, according to some embodiments. In the illustrated embodiment, the emergency menu allows making emergency calls (e.g., to certain predetermined numbers) and includes an icon to access medical ID information. Examples of medical ID information include, without limitation: name, blood type, height, weight, emergency contact information, allergies, etc.

Additional Exemplary Embodiments

In some embodiments, an apparatus comprises one or more processing elements configured to: authenticate a user by comparing data from one or more biometric sensors to stored template biometric data for the user; and subsequent to the authentication, in response to a request to access a particular type of information stored on the apparatus, require the user to both manually enter an authentication credential and re-authenticate using the one or more biometric sensors before authorizing an action (such as providing the particular type of information to the user, for example).

In some embodiments, an apparatus comprises one or more processing elements configured to authenticate a user by comparing data from one or more biometric sensors to stored template biometric data for the user; generate a token for the user based on the authentication; in response to a request to access a particular type of information stored on the apparatus: invalidate the token; and require a user to manually enter an authentication credential before providing the particular type of information to the user. In some embodiments, the apparatus is also configured to require biometric re-authentication before providing the particular type of information to the user.

Exemplary Design Information

Figure 5:
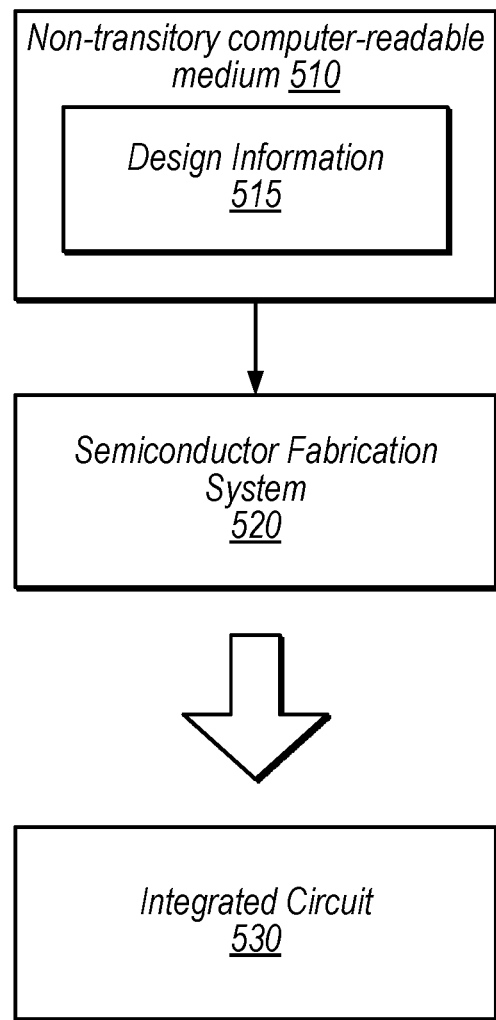
FIG. 5 is a diagram illustrating an exemplary computer-readable medium that stores design information, according to some embodiments.

FIG. 5 is a block diagram illustrating an exemplary non-transitory computer-readable storage medium that stores circuit design information, according to some embodiments. In the illustrated embodiment semiconductor fabrication system 520 is configured to process the design information 515 stored on non-transitory computer-readable medium 510 and fabricate integrated circuit 530 based on the design information 515.

Non-transitory computer-readable medium 510, may comprise any of various appropriate types of memory devices or storage devices. Medium 510 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 510 may include other types of non-transitory memory as well or combinations thereof. Medium 510 may include two or more memory mediums which may reside in different locations, e.g., in different computer systems that are connected over a network.

Design information 515 may be specified using any of various appropriate computer languages, including hardware description languages such as, without limitation: VHDL, Verilog, SystemC, SystemVerilog, RHDL, M, MyHDL, etc. Design information 515 may be usable by semiconductor fabrication system 520 to fabrication at least a portion of integrated circuit 530. The format of design information 515 may be recognized by at least one semiconductor fabrication system 520. In some embodiments, design information 515 may also include one or more cell libraries which specify the synthesis and/or layout of integrated circuit 530. In some embodiments, the design information is specified in whole or in part in the form of a netlist that specifies cell library elements and their connectivity.

Semiconductor fabrication system 520 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 520 may also be configured to perform various testing of fabricated circuits for correct operation.

In various embodiments, integrated circuit 530 is configured to operate according to a circuit design specified by design information 515, which may include performing any of the functionality described herein. For example, integrated circuit 530 may include any of various elements shown in FIGS. 1 and/or 3. Further, integrated circuit 530 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above and have been depicted in the accompanying appendix below, these embodiments are not intended to limit the scope of the present disclosure, even where only a single embodiment is described with respect to a particular feature. Examples of features provided in the disclosure are intended to be illustrative rather than restrictive unless stated otherwise. For example, references to the term "car" may encompass any suitable vehicle (or even other devices that can receive commands from a mobile device). As another example, references to the term "phone" may encompass any suitable mobile device. Accordingly, the above and below descriptions are intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having instructions stored thereon that are executable by a computing device to perform operations comprising:
   storing personal information corresponding to a user of the computing device;
   authorizing a request for a first action using a first type of authentication during a first mode of operation;
   detecting that the computing device has received user input that requests an operation, wherein the operation includes to output at least a portion of the personal information externally to the computing device in audio or visual form; and
   in response to the detecting, changing to a second mode of operation in which a user is required to perform a second type of authentication before authorizing a request for the first action, wherein the second type of authentication is a different than the first type of authentication.

2. The non-transitory computer-readable medium of claim 1, wherein the operations further comprise:
   externally outputting the at least a portion of the personal information in response to the request.

3. The non-transitory computer-readable medium of claim 1, wherein the user input is detected via a microphone.

4. The non-transitory computer-readable medium of claim 1, wherein the first type of authentication requires a biometric authentication and the second type of authentication requires a passcode authentication.

5. The non-transitory computer-readable medium of claim 1, wherein the second type of authentication requires a greater number of authentication credentials than the first type of authentication.

6. The non-transitory computer-readable medium of claim 1, wherein the operations further comprise:
revoking, in response to the detecting, a token that was issued based on the first type of authentication.

7. The non-transitory computer-readable medium of claim 1, wherein the information corresponding to the user of the computing device includes one or more of: an account name, medical information, a username, contact information, or information usable to determine the user's name.

8. The non-transitory computer-readable medium of claim 1, wherein the operations further comprise:
instructing another device of the user to require a non-default type of authentication for an action.

9. The non-transitory computer-readable medium of claim 1, wherein in the second mode of operation the user is required to perform both the first and second types of authentication before authorizing a request for the first action.

10. An apparatus, comprising:
one or more processor circuits configured to:
store personal information corresponding to a user of the apparatus;
authorize a request for a first action using a first type of authentication during a first mode of operation;
detect that the apparatus has received user input that requests an operation, wherein the operation includes to output at least a portion of the personal information externally to the apparatus in audio or visual form; and
in response to the detection, change to a second mode of operation in which the one or more processor circuits require a user to perform a second type of authentication before authorizing a request for the first action, wherein the second type of authentication is a different than the first type of authentication.

11. The apparatus of claim 10, wherein the one or more processor circuits are further configured to:
externally outputting the at least a portion of the personal information in response to the request.

12. The apparatus of claim 10, further comprising:
a microphone, wherein the user input is detected via the microphone.

13. The apparatus of claim 10, wherein the first type of authentication requires a biometric authentication and the second type of authentication requires a passcode authentication.

14. The apparatus of claim 10, wherein the one or more processor circuits are further configured to:
revoke, in response to the detection, a token that was issued based on the first type of authentication.

15. The apparatus of claim 10, wherein the one or more processor circuits include a secure circuit configured to control access to the personal information and wherein the apparatus is configured such that other processing elements in the apparatus are configured to communicate with the secure circuit via only a predetermined subset of circuitry included in the secure circuit, wherein hardware resources of the secure circuit, other than the predetermined subset of circuitry, are not accessible to the other processing elements in the apparatus.

16. A method, comprising:
storing, by a computing device, personal information corresponding to a user of the computing device;
authorizing, by the computing device, a request for a first action using a first type of authentication during a first mode of operation;
detecting, by the computing device, that the computing device has received user input that requests an operation, wherein the operation includes to output at least a portion of the personal information externally to the computing device in audio or visual form; and
in response to the detecting, the computing device changing to a second mode of operation in which a user is required to perform a second type of authentication before authorizing a request for the first action, wherein the second type of authentication is a different than the first type of authentication.

17. The method of claim 16, wherein the user input is detected via a microphone.

18. The method of claim 16, wherein the first type of authentication requires a biometric authentication and the second type of authentication requires a passcode authentication.

19. The method of claim 16, further comprising:
revoking, in response to the detecting, a token that was issued based on the first type of authentication.

20. The method of claim 16, further comprising:
instructing another device of the user to require a non-default type of authentication for an action.

* * * * *